June 9, 1936. W. H. ROBBINS Re. 20,002

POLISHING DEVICE

Original Filed May 22, 1933 2 Sheets-Sheet 1

Inventor
WILLIAM H. ROBBINS,
By Toulmin & Toulmin
Attorneys

June 9, 1936. W. H. ROBBINS Re. 20,002

POLISHING DEVICE

Original Filed May 22, 1933 2 Sheets-Sheet 2

Inventor
William H. Robbins
Toulmin & Toulmin
Attorneys

Reissued June 9, 1936

Re. 20,002

UNITED STATES PATENT OFFICE 20,002

POLISHING DEVICE

William H. Robbins, Delray Beach, Fla., assignor to The Williams Company, London, Ohio, a corporation of Ohio Original No. 1,988,335, dated January 15, 1935, Serial No. 672,272, May 22, 1933. Application for reissue April 4, 1936, Serial No. 72,799

6 Claims. (Cl. 15—230)

My invention relates to steel wool and particularly to pads or buffers made from steel wool, with or without other materials.

It is an object of my invention to provide a steel wool pad having a toroidal or annular shape.

It is another object to provide a method of making an annular or ring-shaped steel wool pad which is economical and efficient.

It is another object to provide an annular steel wool pad which is composed of a plurality of separate portions which in assembly form a ring-shaped pad.

My object is to provide an article of manufacture for use on rotary machines on which this annular steel wool pad is mounted: and in such an arrangement the steel wool strands, which are long continuously wound strands, are arranged in elongated loops which lie in axial planes.

Therefore, the strands are substantially at right angles to the direction of movement of the rotary pad. A number of these radial strands are superimposed one over the other and form a deep long-wearing cushion which gives an even abrasive effect upon the surface engaged.

Figure 1:
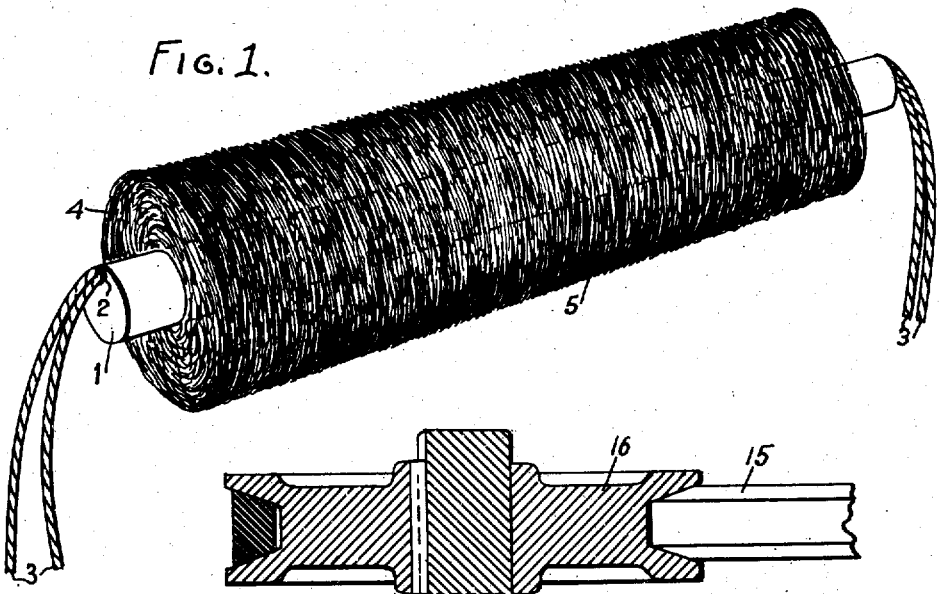
Figure 1 is a perspective view of one of my improved steel wool pads during the manufacture thereof.

Referring to the drawings in detail, 1 is a mandrel which is capable of being rotated. Along one side of this mandrel runs a longitudinal groove 2 through which cords 3 loosely pass.

Figure 3:
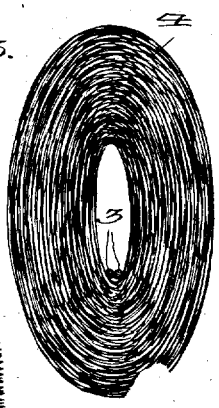
Figure 3 is an enlarged cross-sectional view through the pad of Figure 2, showing the internal construction of the ring-shaped pad.

The mandrel 1 is mounted in a rotatory apparatus and the cords 3 are placed in the slot 2. Steel wool ribbon 4 is then wound upon the mandrel 1 as the latter is rotated, and builds itself up in layers as shown in Figure 3.

This steel wool ribbon does not in itself form a part of this invention: it may be fed to the mandrel from drums upon which it is stored and from which it is unrolled much like tape or ribbon from a spool, or roller bandage from a roll of that material. The manufacture of this steel wool ribbon is well known to those skilled in the art.

The successive layers of steel wool ribbon gradually build themselves up into a cylinder-like roll 5 of steel wool: when this has reached a satisfactory diameter as shown in Figure 1, the rotation of the machine is halted. The mandrel is then removed from the machine and carefully withdrawn from the roll 5, leaving the cords 3 in their position passing through the hole in the center of the steel wool roll 5.

The cylindrical roll 5 of steel wool is now swung into annular or toroidal form about a head 10 by pulling the opposite ends of the cords 3 together and tying them firmly in a knot: The steel wool now takes a ring-shaped form 7, and the cords 3 occupy a circular position.

If it is desired to use the annular steel wool pad 7 on a rotating plate, it may be held thereon by any suitable means and pressed down against the plate until it has the oval cross section shown in Figure 3.

Figure 4:
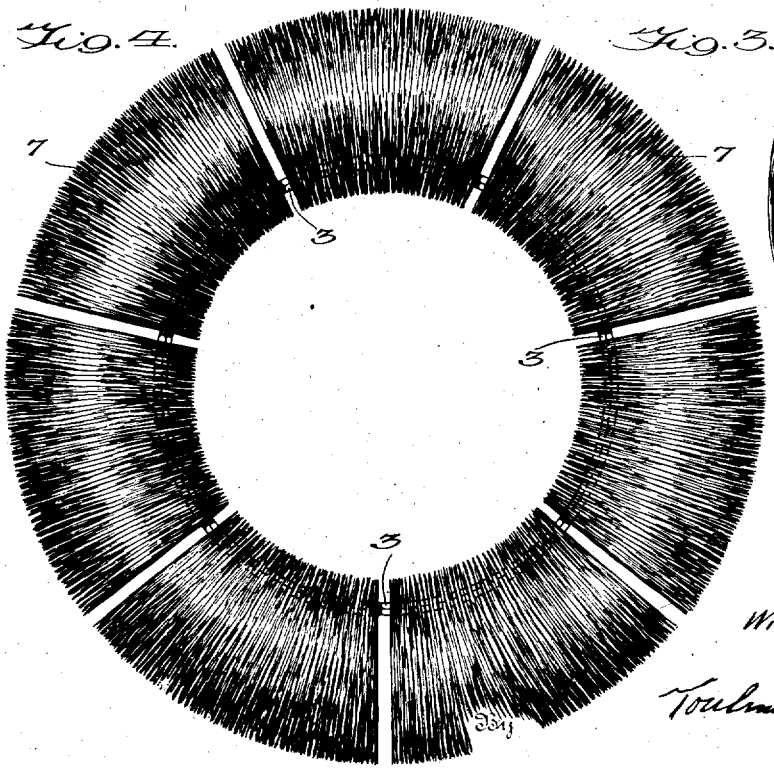
Figure 4 is a modified form of the steel wool pad, having separated portions which unite in assembly to form a ring-shaped pad.

A modified form of annular steel wool pad is shown in Figure 4. It consists of a plurality of separate portions which in assembly are placed end to end to form a ring or torus. These sections may be wound separately on independent mandrels in the manner previously described, or the several sections wound either successively or simultaneously on a common mandrel 1. The sections are then united by tying the cords 3 in the same manner as previously described. It is also obvious that a steel wool roll 5 may be wound on a long mandrel and then cut up into sections which are thereafter assembled in annular form, a new cord being threaded through the centers of the sections in bead-like fashion, or else the individual sections of cord may be reunited in an obvious manner.

My annular steel wool pad, in either of its forms previously described, is particularly adapted to use in a portable rotating machine. The pad is held by a head 10 mounted on the shaft 11 by the threaded connection 12 and fitting its central aperture in any convenient manner. The shaft 11 is rotatably supported on the bracket 13 by the antifriction bearings 14 and is then adapted to be rotated by the electric motor or other power source applied to the machine such as by the belt 15 engaging the pulley 16 keyed to the shaft 11. The disintegration of the pad through centrifugal force is prevented by the strands being held together by their annularly wound construction. The hollow construction of the pad permits the distribution of the steel wool along the lines of the greatest work, whereas a solid pad wears unevenly, being greater on the periphery, where the linear speed is greater, than on the inner edge of the pad. Used in this manner, my annular steel wool pad finds very valuable and important applications to cleaning, scouring, or partially re-surfacing floors, decks, tables, counters and other like surfaces, especially in hospitals, schools, factories and ships. The creation of flying dust, as occurs in other types of re-surfacing or scouring machines is greatly reduced by the use of my annular steel wool pad and may be eliminated entirely by combining, with the rotary machine, a dust-collecting device such as the vacuum suction mechanism well known in the art.

Figure 2:
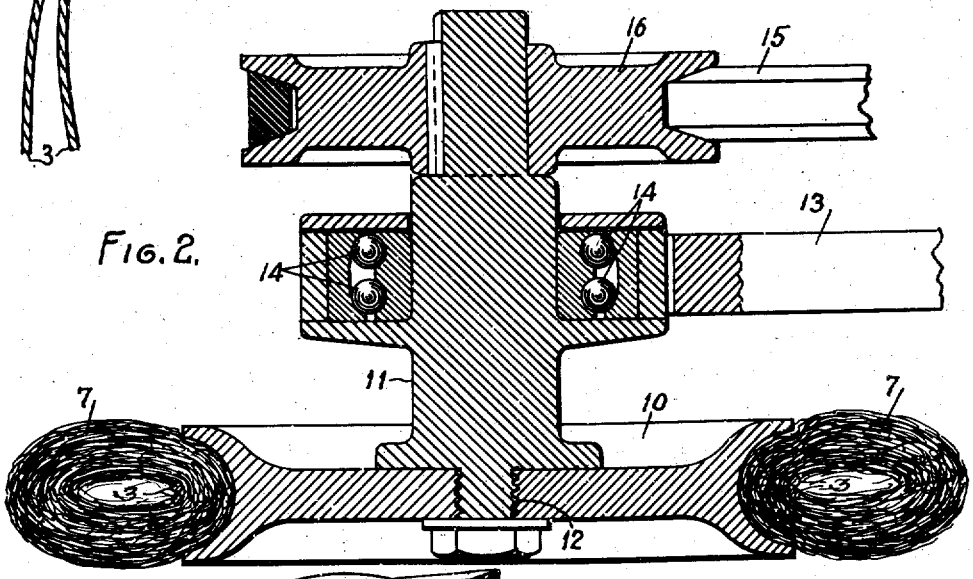
Figure 2 is a section through the ring-shaped steel wool pad and the rotary head upon which the pad is mounted.
Figure 5:
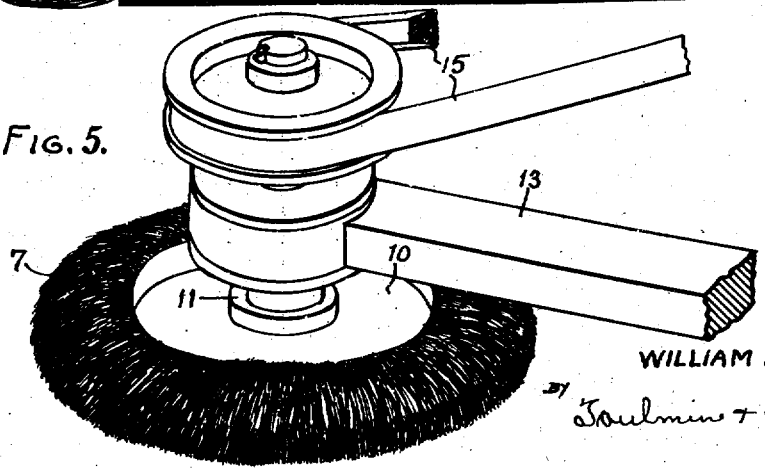
Figure 5 is a perspective view of the devices shown in Figure 2.
Figure 6:
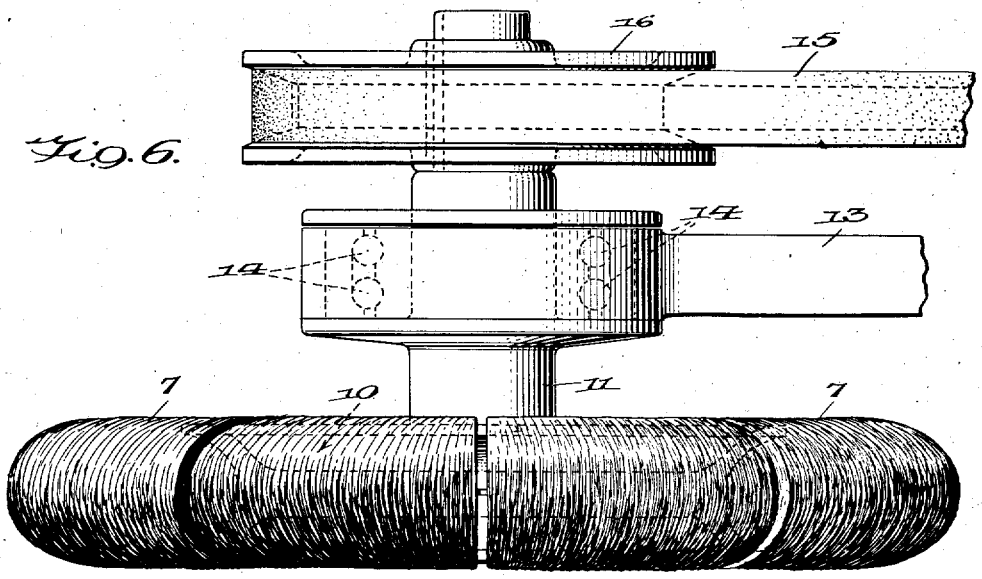
Figure 6 is a side elevation of the pad according to Figure 4 mounted on a rotary head similar to that shown in Figure 2.

The steel wool pad indicated in Figure 4 has been illustrated as being mounted on a rotary head in Figure 6. The rotary head indicated in Figure 2 has been used as a mounting for the pad, the same numerals used in the description of Figure 2 indicate identical parts in Figure 6.

It will be understood that I desire to comprehend within my invention such modifications as may be necessary to adapt it to varying conditions and uses.

Having thus fully described my invention, what I claim as new and desire to secure by Letters Patent is:

1. A new article of manufacture for polishing, comprising a rotary head, a ring-shaped steel wool pad having an aperture receiving said head, said pad being composed of layers of steel wool ribbon, the strands of steel wool comprising loops lying in axial planes of the ring.

2. A new article of manufacture for polishing, comprising a ring-shaped steel wool pad having an aperture adapted to be placed upon a rotary head, said pad being composed of layers of steel wool ribbon wound in spiral superposition on one another, the strands of steel wool comprising loops lying in axial planes of the ring.

3. A new article of manufacture for polishing, comprising a rotary head, a ring-shaped steel wool pad mounted on said head, said pad being composed of layers of steel wool ribbon wound in spiral superposition on one another, the strands of steel wool comprising loops lying in axial planes of the ring.

4. A new article of manufacture for polishing, comprising a rotary head, a ring-shaped steel wool pad driven by said head and substantially co-axial therewith; said pad being composed of a plurality of sections arranged end to end in an annular form, and having a central aperture, said pad being composed of layers of steel wool ribbon, the strands of steel wool comprising loops lying in axial planes of the ring.

5. A new article of manufacture for polishing, comprising a ring-shaped steel wool pad adapted to be rotated about its axis, said pad being composed of layers of steel wool ribbon, the strands of steel wool comprising loops lying in axial planes of the ring.

6. A new article of manufacture for polishing, comprising a ring-shaped steel wool pad adapted to be rotated about its axis, said pad being oval in cross section with the longer diameter of the section disposed radially of the ring and being composed of layers of steel wool ribbon, the strands of steel wool comprising loops lying in axial planes of the ring.

WILLIAM H. ROBBINS.